(No Model.)
A. PAULS.
COMBINED SCISSORS AND TRACING WHEEL.
No. 438,017. Patented Oct. 7, 1890.
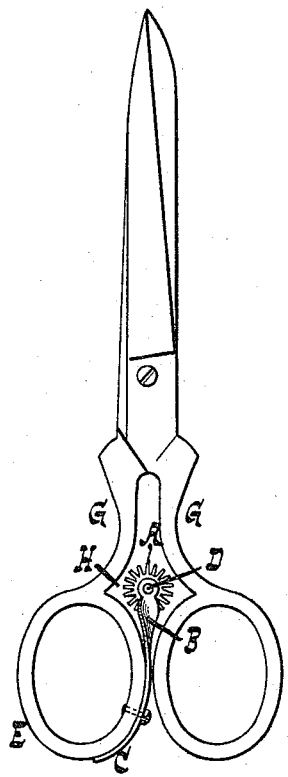
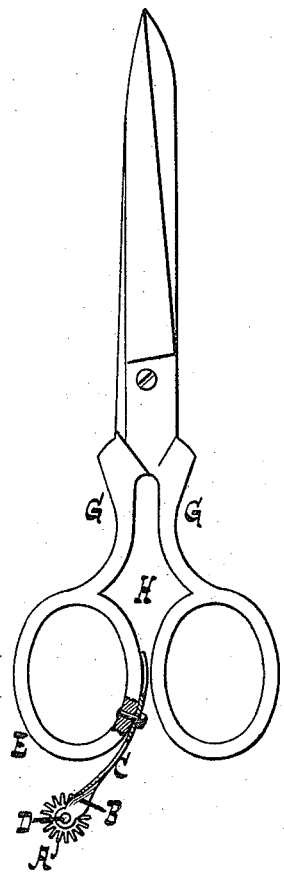
WITNESSES:
William Miller
Edward Wolff
INVENTOR:
August Pauls.
BY Van Santvoord & Hauff
ATTORNEYS

UNITED STATES PATENT OFFICE.

AUGUST PAULS, OF BROOKLYN, NEW YORK.

COMBINED SCISSORS AND TRACING-WHEEL.

SPECIFICATION forming part of Letters Patent No. 438,017, dated October 7, 1890.

Application filed June 12, 1890. Serial No. 355,221. (No model.)

*To all whom it may concern:*

Be it known that I, AUGUST PAULS, a citizen of the Empire of Germany, residing at Brooklyn, county of Kings, and State of New York, have invented new and useful Improvements in Tracing-Wheel Attachments to Scissors, of which the following is a specification.

This invention relates to that type of scissors having an attached wheel for tracing patterns on fabrics to indicate the lines on which the goods are to be cut by the scissors.

The present invention has for its object to provide a novel tracing-wheel attachment whereby the wheel can be folded or turned between the handles of the scissors.

To accomplish this object my invention involves the features of construction and combination or arrangement of parts and the principles of operation hereinafter described and claimed, reference being had to the accompanying drawings, in which—

Figure 1 represents the tracing-wheel projecting from the scissors in position for use. Fig. 2 represents the tracing-wheel retired between the handle of the scissors.

The letter A designates the tracing-wheel, which turns between the forked ends B of a reversible bar C, the axis or pin D, on which the said bar is mounted, having its bearings in the forked ends B of said bar. The bar C is connected to the inner part of one of the bows E of the scissors by a pivot F, on which the bar can be turned. The location of the pivot and the point of connection of the bar with the bow are such that when the reversible bar has been turned to the position shown in Fig. 2 the wheel A will be between the handles G G of the scissors, where it is out of the way and is protected from harm when the scissors is operated. The reversible bar C is made for the greater part of its length of such a curve as to conform to the curved shape of the part of the bow where it is connected and to fit closely thereto, as shown in the drawings, and is also curved in cross-section on its inner side to correspond to the rounded edge of the bow, the construction and arrangement being such that the bar C comes against the edge of the bow and embraces or engages it with a spring-like action when it is in either of the positions shown in the drawings—that is to say, in the position shown in Fig. 1 or in that shown in Fig. 2.

When it is desired to bring the tracing-wheel into the proper position for use, its bar C is pushed away from the position in which it is shown in Fig. 2 into the position shown in Fig. 1, thereby reversing its position and bringing the wheel out of the protected space H between the handles G G to a position beyond the end of the bow of the scissors and ready for use. This reversal of the position of the wheel and its bar can be made without opening the scissors, and, furthermore, when the wheel is in the position shown in Fig. 2 the scissors can be operated without interfering with the wheel or its bar.

What I claim as new, and desire to secure by Letters Patent, is—

1. A scissors having a swinging bar carrying at or near one end a tracing-wheel and pivoted at or near its opposite end to the inner side portion of one of the handle-bows, substantially as and for the purposes described.

2. A scissors having a curved spring-bar carrying a tracing-wheel at or near one end and pivoted at or near the opposite end to the inner side portion of one of the handle-bows, substantially as and for the purposes described.

In testimony whereof I have hereunto set my hand in the presence of two subscribing witnesses.

AUGUST PAULS.

Witnesses:
J. VAN SANTVOORD,
E. F. KASTENHUBER.